US006857978B2

(12) United States Patent
Polster et al.

(10) Patent No.: US 6,857,978 B2
(45) Date of Patent: Feb. 22, 2005

(54) TENSIONING DEVICE FOR A BELT-DRIVEN STARTER-GENERATOR

(75) Inventors: Rudolf Polster, Baiersdorf (DE); Rudolf Berger, Simmerath (DE); Michael Bogner, Eckental (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/349,328

(22) Filed: Jan. 22, 2003

(65) Prior Publication Data

US 2003/0176249 A1 Sep. 18, 2003

Related U.S. Application Data

(63) Continuation of application No. PCT/EP01/06998, filed on Jun. 21, 2001.

(30) Foreign Application Priority Data

Jul. 27, 2000 (DE) .......................................... 100 36 545
Sep. 13, 2000 (DE) .......................................... 100 45 143

(51) Int. Cl.$^7$ .............................. F16H 7/08; F16H 7/12
(52) U.S. Cl. ...................................... 474/134; 474/135
(58) Field of Search ................................ 474/114, 117, 474/86, 110, 135, 133, 101, 136–138; 123/90.15, 90.31

(56) References Cited

U.S. PATENT DOCUMENTS

| | | | |
|---|---|---|---|
| 3,811,332 A | | 5/1974 | Brown et al. |
| 4,069,719 A | * | 1/1978 | Cancilla ..................... 474/134 |
| 4,416,647 A | * | 11/1983 | White, Jr. ................... 474/134 |
| 4,525,151 A | * | 6/1985 | Tomita et al. .............. 474/134 |
| 4,530,682 A | * | 7/1985 | Gruber et al. .............. 474/133 |
| 4,758,208 A | | 7/1988 | Bartos et al. |
| 4,822,321 A | * | 4/1989 | Webb ......................... 474/117 |
| 4,981,116 A | * | 1/1991 | Trinquard ................... 474/134 |
| 6,151,924 A | * | 11/2000 | Plath et al. ................. 474/110 |
| 6,648,783 B1 | * | 11/2003 | Bogner ....................... 474/134 |

FOREIGN PATENT DOCUMENTS

| | | | |
|---|---|---|---|
| DE | 174 480 C | 9/1906 | |
| DE | 0 261 056 C | 6/1913 | |
| DE | 488 058 C | 1/1930 | |
| DE | 0 550 085 C | 5/1932 | |
| DE | 0 570 339 C | 2/1933 | |
| DE | 40 26 013 A1 | 2/1992 | |
| DE | 198 49 886 A1 | 5/2000 | |
| DE | 100 44 645 A1 * | 3/2002 | ............. F16H/7/08 |
| EP | 1 122 464 A | 8/2001 | |
| FR | 0 958 579 A | 3/1950 | |
| GB | 0 511 853 A | 8/1939 | |
| GB | 0 549 175 | 11/1942 | |
| GB | 918162 * | 2/1963 | |
| JP | 57-124056 * | 8/1982 | ............. 474/134 |
| JP | 0008334031 | 12/1996 | |
| JP | 0009144821 | 6/1997 | |

* cited by examiner

*Primary Examiner*—Marcus Charles
(74) *Attorney, Agent, or Firm*—Henry M. Feiereisen

(57) ABSTRACT

A traction device for an internal combustion engine includes a tensioning device having two lever arms of different lengths which are rigidly connected together and which are pivotally mounted for rotation about a rotation axis. Each of the lever arms supports on one end a tension pulley. The tensioning device is provided for positioning the tension pulleys on a pulling strand and a return strand by imposing an elastic force thereon.

14 Claims, 4 Drawing Sheets

TENSIONING DEVICE FOR A BELT-DRIVEN STARTER-GENERATOR

CROSS-REFERENCES TO RELATED APPLICATIONS

This application is a continuation of prior filed copending PCT International application no. PCT/EP01/06998, filed Jun. 21, 2001, which designated the United States and on which priority is claimed under 35 U.S.C. §120, the disclosure of which is hereby incorporated by reference.

This application claims the priority of German Patent Applications, Ser. Nos. 100 36 545.0, filed Jul. 27, 2000, and 100 45 143.8, filed Sep. 13, 2000, pursuant to 35 U.S.C. 119(a)–(d), the disclosure of which is incorporated herein by reference.

BACKGROUND OF THE INVENTION

The present invention relates, in general, to a traction drive for a starter-generator unit of an internal combustion engine, and more particularly to a tensioning device for the traction drive.

A traction drive of a type involved here may include a first pulley which is operatively connected to the crankshaft of the internal combustion engine, a second pulley which is operatively connected to the starter-generator, and a tensioning device for biasing the pulling strand and the return strand of the traction drive. The starter-generator is a structural component to start the internal combustion engine in dependence on the operating mode, or to generate electric energy while the internal combustion engine is running. Thus, the starter-generator assumes the function of a starter as well as the function of a generator. Depending on the respective operating mode, the starter-generator or the internal combustion engine introduces a torque into the traction drive, resulting in a swap between the return strand and the pulling strand in the traction drive. As a consequence of the directional change of the torque, the tensioning device requires two tension pulleys for sufficiently tension the respective return strand of the traction drive.

Japanese patent publication JP 09 144 821 A1 describes a traction drive with a tensioning device having two tension pulleys associated to a return strand or a pulling strand. This conventional traction drive has a driving pulley and a driven pulley of same dimension and connected by a belt as traction member. The tensioning device includes a straight arm which is fixedly supported in midsection thereof and has opposite ends for respectively supporting the tension pulleys in symmetric relationship, whereby one tension pulley is associated to the pulling strand and the other tension pulley is associated to the return strand. A spring member is hooked on one end side of the arm to force the tension pulleys of the tensioning device against the belt. As the tension pulleys of the tensioning device have a same size and as a result of the symmetric support, the wrap angle of the belt about the tension pulleys is, as a consequence of the spring member, identical, when the traction drive is in operating mode.

It would be desirable and advantageous to provide a traction drive with improved tensioning device which sufficiently tensions the traction member, regardless of the direction of the torque being introduced into the traction drive.

SUMMARY OF THE INVENTION

According to one aspect of the present invention, a traction drive for an internal combustion engine includes a belt pulley operatively connected to a crankshaft, a belt pulley operatively connected to a starter-generator, and a tensioning device having two tension pulleys, a traction member for connecting the tension pulleys, two lever arms having different length and constructed for pivoting about a rotation axis, with one tension pulley disposed on one end of one of the lever arms and resiliently bearing against the traction member, and with the other tension pulley disposed on one end of the other one of the lever arms and resiliently bearing against the traction member, wherein the internal combustion engine or the starter-generator selectively introduce a torque into the traction member in dependence on an operating mode of the starter-generator between a starting mode and a normal operating mode, wherein a directional change of the torque is accompanied by a swap between a return strand and a pulling strand of the traction member in the traction drive, and wherein the traction member is wrapped about the tension pulleys at different wrap angles.

The present invention resolves prior art problems by providing a tensioning device which is so configured that the traction member is wrapped about the tension pulleys at different wrap angles regardless of the direction of introduction of the torque into the traction drive. As a result, the tensioning device ensures also in conjunction with a starter-generator unit, in which the torque changes its direction depending on the operating mode, that the return strand is taut enough. Thus, the tensioning device satisfies two separate functions that are necessary for a starter-generator unit. The tension pulley, which is associated to the return strand, acts hereby on the tension pulley, which is associated to the pulling strand, in such a way that a deflection of the pulling-strand associated tension pulley applies a corresponding countermoment to thereby increase the supporting force of the return-strand associated tension pulley. This interaction is assisted by disposing the tension pulleys of the tensioning device upon torsionally rigid lever arms.

A tensioning device in accordance with the present invention thus effects a simultaneous tensioning of the return strand as well as the pulling strand, irrespective of the direction at which the torque is introduced into the traction drive. Therefore, a tensioning device according to the present invention is especially suitable for a starter-generator unit to ensure a sufficient tension of the traction member even when the torque changes between the starting mode and the normal operating mode.

As a consequence of the different length configuration of the lever arms and the placement of the traction member at different wrap angles around the tension pulleys reinforces together the impact and interaction between both tension pulleys for attaining an enhanced tensioning of the respective strand of the traction member.

The wrap angles of the traction member about the tension pulleys are so selected that the tension pulley associated to the return strand compensates more slack during a pivoting motion of the tensioning device than the slack by which the other tension pulley, associated to the pulling strand, slackens. As a consequence, the tensioning force upon the return strand is increased to thereby positively affect the slip behavior of the entire traction drive.

According to another feature of the present invention, the tension pulley associated to the pulling strand is positioned in a dead center position, when the starter-generator is in the starter mode, whereby a resultant force of the pulling strand substantially coincides with a connecting line between the rotation axis of the tensioning device and a rotation axis of the tension pulley resting against the pulling strand. In this dead center position, the lever arm of the tensioning device assumes a disposition in which the resultant pulling strand force no longer has any effective lever length. Even a change in the pulling strand force will have no impact on a shift of the tensioning device as the resultant pulling strand force extends in parallel relationship to or in the plane of an imaginary connecting line between the pivot point of the tensioning device and the pivot point of the tension pulley bearing against the pulling strand.

In addition to the different lever arms of the tensioning device, also the wrap angles of the traction member about the respective tension pulleys deviate from one another. The tension pulley that is mounted to the shorter lever arm has hereby a greater wrap angle of the traction member, while the tension pulley which bears upon the return strand during starting mode is wrapped by the traction member at a smaller wrap angle. The tension pulley with greater wrap angle hereby acts on the other tension pulley which therefore is urged at a greater force against the traction member.

The present invention contemplates various measures to further influence the tensioning force of the traction member. For example, the tension pulleys may be disposed on levers of different lengths or at different distance measures. According to one feature of the present invention, the rotation axis of the tensioning device may be spaced from a directional arrow, which is oriented through a pivot point of the return-strand associated tension pulley and defines a resultant force of the return strand, at a first distance measure which exceeds a second distance measure defined between the rotation axis of tensioning device and a directional arrow, which is oriented through a pivot point of the pulling-strand associated tension pulley and defines a resultant force of the pulling strand.

According to another feature of the present invention, the first distance measure may be at a maximum, when the return-strand associated tension pulley bears upon the return strand of the traction member in the starter mode. The maximum of the first distance measure exceeds the second distance measure between the rotation axis of tensioning device and the directional arrow of the resultant force of the pulling strand in the area of the tension pulley. In this way, a high tensioning force of the traction member is attained and a slip-free drive, i.e., a safe starting of the internal combustion engine, is assured.

When the traction drive is in normal operating mode, the tensioning device according to the present invention turns counterclockwise to a limited extent beginning from the starting mode, so that the distance measure between the rotation axis of the tensioning device and the tension pulley, supported by the return strand, decreases compared to the starting mode. At the same time, the distance measure between the rotation axis of the tensioning device and the tension pulley, bearing against the pulling strand, increases.

According to another feature of the present invention, the traction member is wrapped around the belt pulley of the starter-generator, as viewed from one of the tension pulleys, before being looped around the other tension pulley. The guidance of the traction member in this manner ensures a sufficient tautness of the traction member to ensure proper operation of the starter-generator, regardless of the operating mode of the starter-generator, i.e., independent from the direction of introduction of the torque into the traction drive.

According to another feature of the present invention, the tensioning device may be provided a spring member for urging the tension pulleys of the tensioning device against the traction member. Examples of a suitable spring member include a hydraulic spring member or mechanical spring member or a combined mechanical-hydraulic spring element. The selection of the spring element depends on the assembly situation at hand, installation space and cost factor. The spring member may be positioned in direct interaction with one of the lever arms, or, as an alternative, may be disposed in the area of the rotation axis of the lever arms for directly acting upon, e.g., a hub of the tensioning device.

According to another feature of the present invention, there may be provided a damping device for providing an effective damping action, especially of fluctuations in torque and/or rotation speed. The provision of a damping device ensures a shock-free and impact-free guidance of the traction member and may be integrated separately from the spring member or combined with the spring member to form a combined spring and damping device for interaction with the tensioning device.

According to another feature of the present invention, the lever arms may extend at an angle of >70° relative to one another. Suitably, the longer lever arm is twice as long as the shorter lever arm.

According to another feature of the present invention, the tension pulley supported on the longer lever arm has a diameter which is greater than the diameter of the tension pulley on the shorter lever arm.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
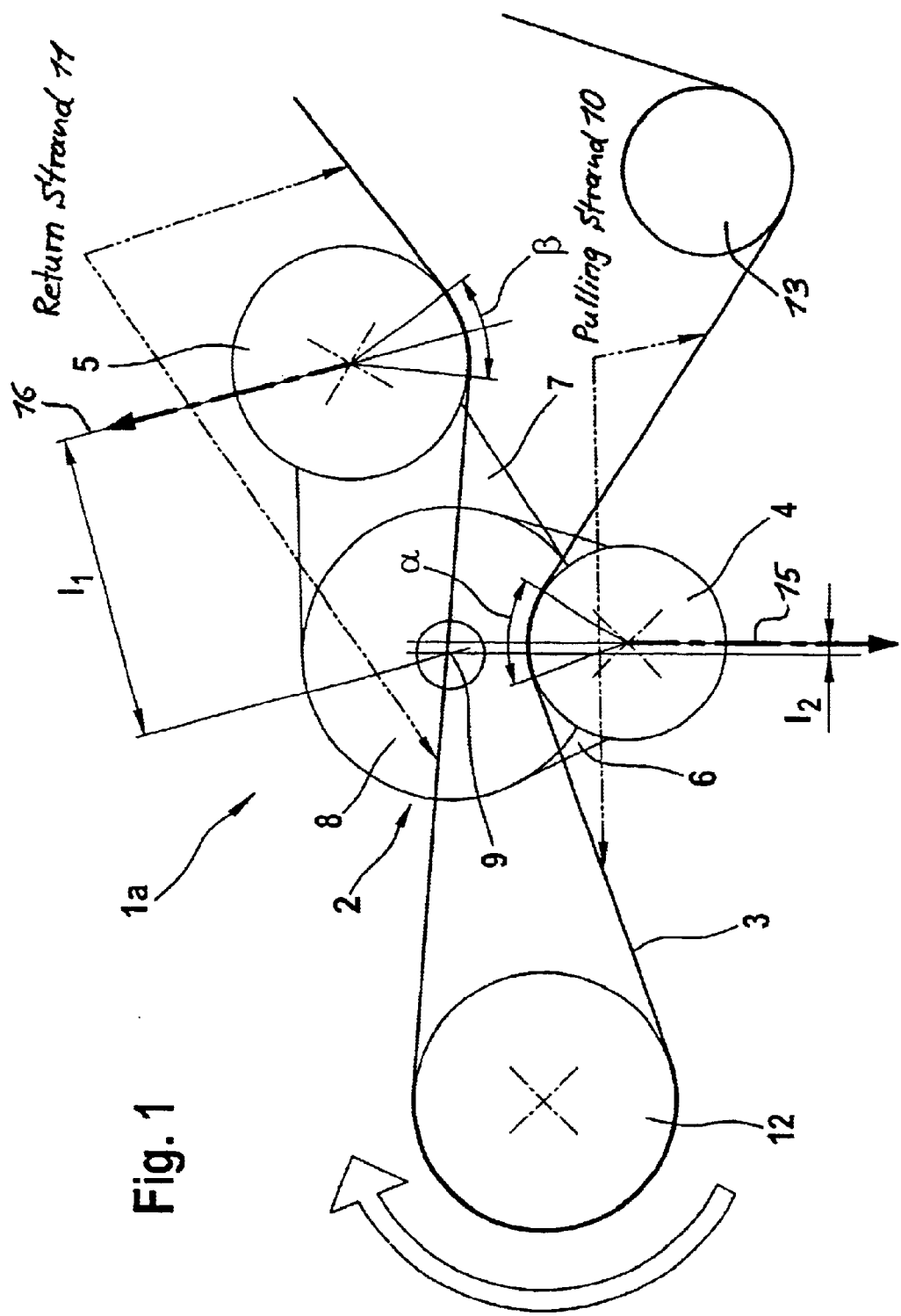
FIG. 1 is a schematic illustration of a traction drive in starting mode and incorporating a tensioning device according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic illustration of a traction drive, generally designated by reference numeral 1a in starting mode and incorporating a tensioning device according to the present invention, generally designated by reference numeral 2 for realizing a sufficient tension of a traction member 3, e.g. a belt, even when a torque introduced into the traction drive 1a changes its direction. The tensioning device 2 includes a hub 8 and two lever arms 6, 7 which are rigidly mounted to the hub 8 in offset relationship, whereby the lever arm 6 supports on the hub-distal end a tension pulley 4, which bears against a pulling strand 10 of the traction member 3, and the lever arm 7 supports on the hub-distal end a tension pulley 5, which bears against a return strand 11 of the traction member 3. The entire tensioning device 2 is swingably mounted about a rotation axis 9 disposed centrally in the hub 8 to effect a sufficient tensioning of the traction member 3 which is guided about the tension pulleys 4, 5.

The traction drive 1a is incorporated in an internal combustion engine and intended for driving various aggregates of the internal combustion engine. Each of the aggregates of the internal combustion engine includes a belt pulley about which the traction member 3 is looped. The traction drive 1a also interacts with a starter-generator unit, which combines a starter and a generator within a unitary structure and includes a pulley 12 about which the traction member 3 is guided. The concept of the starter-generator unit involves an introduction of a torque by the starter-generator or the internal combustion engine into the traction drive 1a in dependence on the operating mode, i.e. the direction of the torque changes between the starting mode and the normal operating mode. Thus, the tensioning device 2 for the traction drive 1a should be able to keep the return strand 11 of the traction member 3 sufficiently taut, i.e., slip-free, in particular in the area of the starter-generator.

As shown in FIG. 1, the tension pulleys 4, 5, bearing against the traction member 3, are arranged in offset relationship at an angle of >70°. The tension pulley 4 is hereby positioned near a dead center in which the tension pulley 4 assumes the function of a deflection roller for the pulling strand 10. A distance measure $I_2$ is hereby defined between the direction of a resultant force, characterized by a directional arrow 15, of the pulling strand 10 in the area of the tension pulley 4 and the rotation axis 9 of the tensioning device 2. In the starting mode shown in FIG. 1, the distance measure 12 approaches hereby zero. As a consequence of this position and arrangement of the tension pulley 4 in the starting mode, a change in the force of the pulling strand 10 is prevented from influencing in any way the tension pulley 5 of the tensioning device 2. The tension pulley 5 of the tensioning device 2 is supported upon the return strand 11 at establishment of a longer distance measure $I_1$ between the direction of a resultant force, characterized by a directional arrow 16, of the return strand 10 in the area of the tension pulley 5 and the rotation axis 9 of the tensioning device 2. The resultant force 16 is hereby oriented in a way as to exploit the lever arm defined by the distance measure $I_2$ which substantially corresponds to a maximum length of the lever arm 7. In this disposition of the tensioning device 2, the moment balance is established almost exclusively by a spring moment or a spring force of a spring member 25, translated to the respective distance measure and the force of the return strand acting on the distance measure $I_1$. The spring member 25 has one spring end 26, engaging formfittingly in the torsionally rigid axle 27, and another spring end 28 connected formfittingly with the lever arm 7 of the tensioning device 2. The spring member 25 acts as torsion spring and applies a force component upon the tensioning device 2 in clockwise direction.

The traction member 3 is looped about the tension pulley 4 by a wrap angle α which is greater than a wrap angle β by which the traction member 3 is looped about the tension pulley 5. The wrap angles α, β determine also the length of the traction member 3 wrapped about the tension pulleys 4, 5 and affect the tensioning force of the traction member 3. As the wrap angle β is smaller than the wrap angle α, the tensioning force in the return strand 11 of the traction member 3 can be realized by applying a slight tension of the tensioning device 2.

Figure 2:
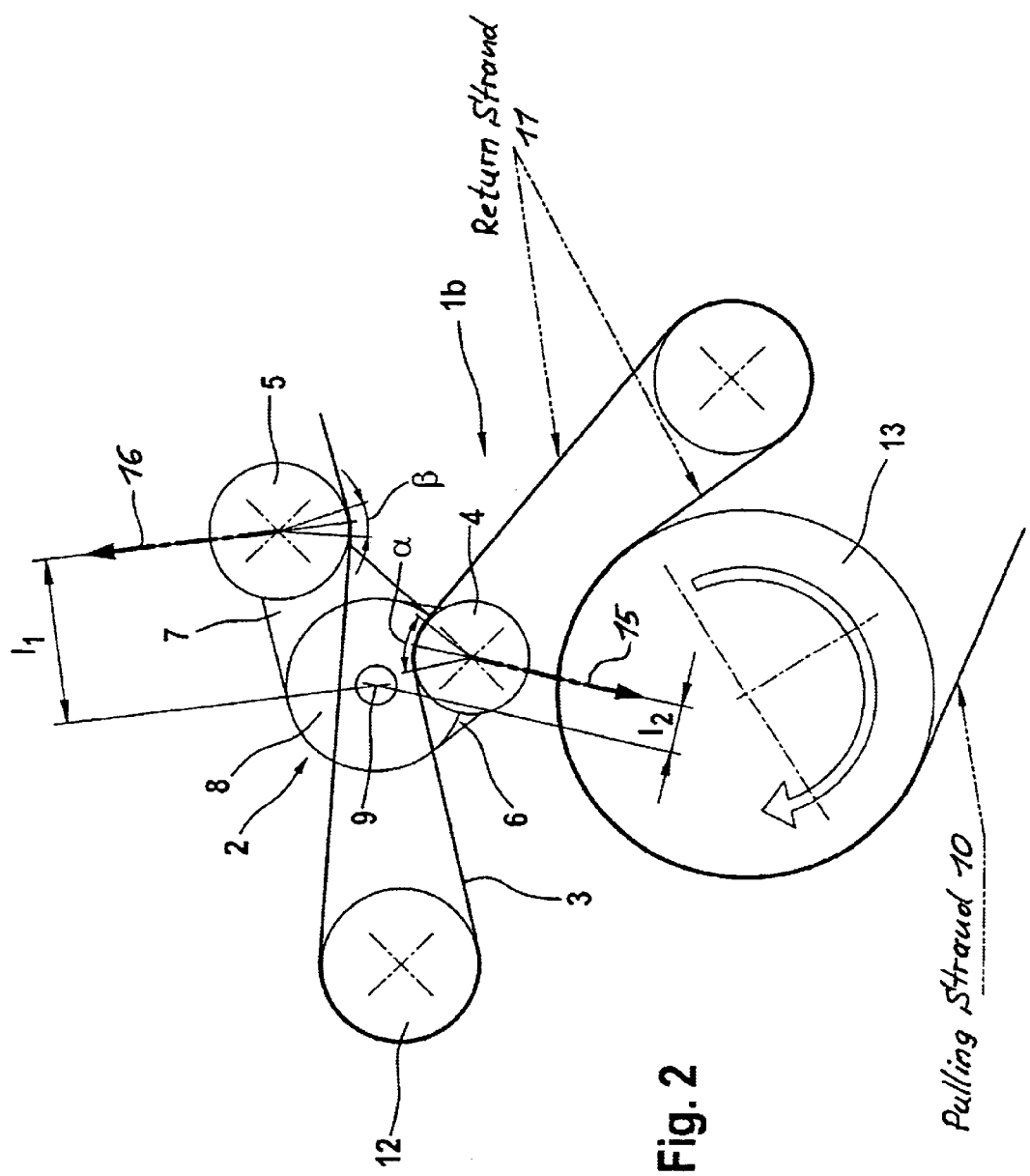
FIG. 2 is a schematic illustration of a modification of the traction drive of FIG. 1 in normal operating mode.

FIG. 2 shows a schematic illustration of a traction drive 1b in normal operating mode, whereby the traction drive 1b further includes a belt pulley 13, which is operatively connected to a crankshaft of the internal combustion engine. Parts corresponding with those in FIG. 1 are denoted by identical reference numerals and not explained again. In this embodiment, the traction drive 1b is driven by the crankshaft via the pulley 13, instead of the starter-generator via the pulley 12. In the normal operating mode, the tension pulley 4 of the tensioning device 2 is now associated to the return strand 11 whereas the tension pulley 5 bears against the pulling strand 10 and is loaded by the drive moment of the generator, thus resulting in a pivoting of the tensioning device 2 counterclockwise. As a consequence, the distance measure $I_1$ decreases and is accompanied at the same time by an increase of the distance measure $I_2$ of the tension pulley 4. An increase of the distance measure $I_2>0$ results in a return force by the tension pulley 4 upon the tension pulley 5 of the tensioning device 2. A moment balance is reached by the spring moment or a spring force of a spring member, translated to the respective distance measure i.e. to the resultant force of the pulling strand 10 acting on the distance measure $I_2$ as well as the force of the return strand 11 acting on the distance measure $I_1$. Also in this embodiment of the traction drive 1b, the wrap angles α, β of the traction member 3 about the tension pulleys 4, 5 are different. The smaller wrap angle β about the tension pulley 5 enables an increase in the tensioning force of the traction member 3 in the return strand 11. The wrap angles α, β are dimensioned in the normal operating mode in such a manner that the tension pulley 4 takes up more slack of the traction member 3 than the loose length of the traction member 3 by which the tension pulley 5 slackens so that the return strand 11 of the traction member 3 is subject to a greater tensioning force.

Figure 3:
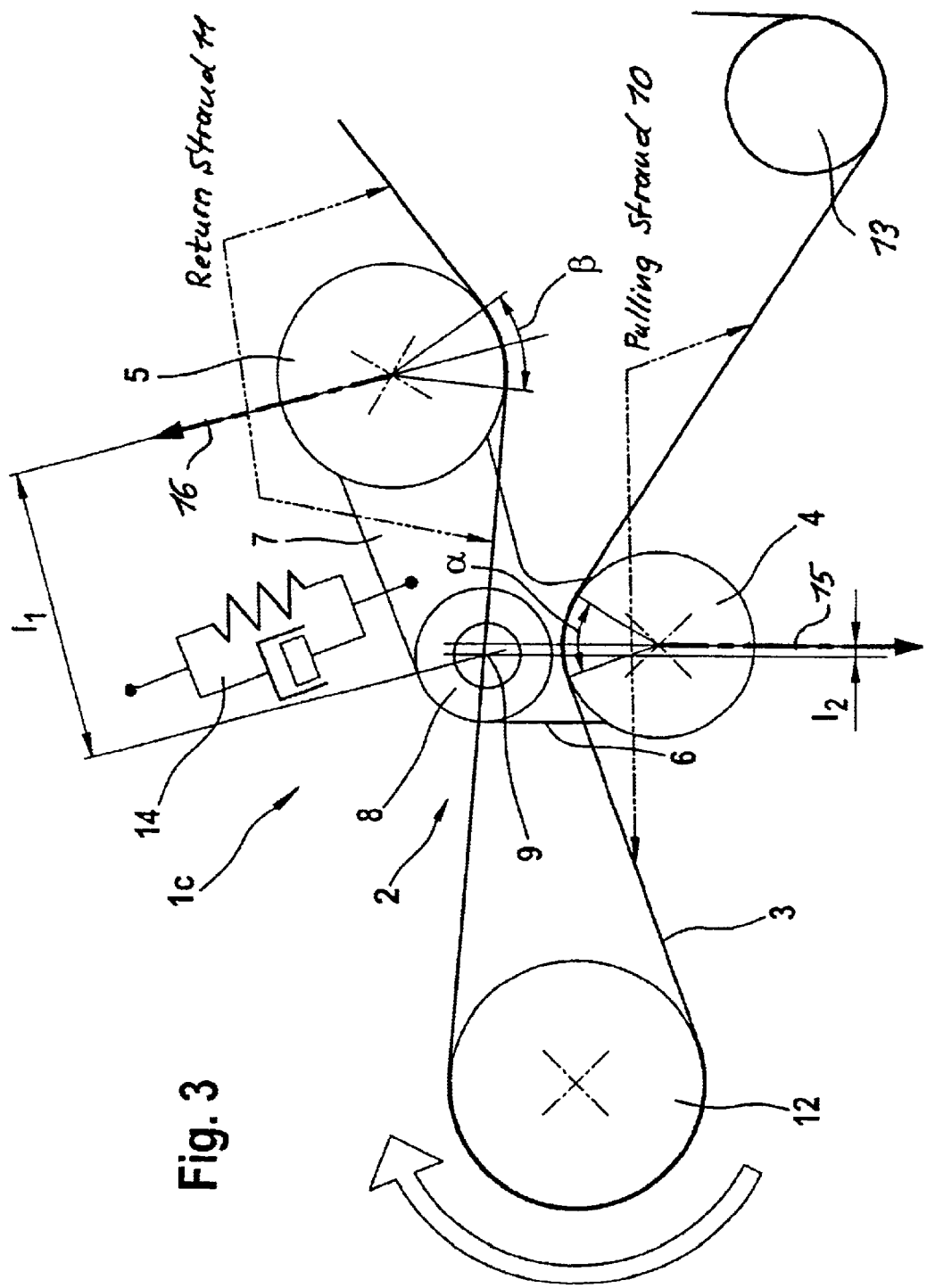
FIG. 3 is a schematic illustration of the traction drive of FIG. 1, provided with a spring member acting on the tensioning device.

FIG. 3 shows a schematic illustration of a traction drive, generally designated by reference numeral 1c, which is similar to the traction drive 1a. Parts corresponding with those in FIG. 1 are denoted by identical reference numerals and not explained again. The traction drive 1c differs from the traction drive 1a only by the provision of a combined spring and damping device 14 which acts upon the lever arm 7 of the tension system 2 to effect a sufficient tension of the traction member 3 and to prevent disadvantageous deflections of the tensioning device 2 as a result of, e.g., imbalances of the internal combustion engine during normal operation. As an alternative, the spring and damping device 14 may also interact with the lever arm 6 of the tensioning device.

Figure 4:
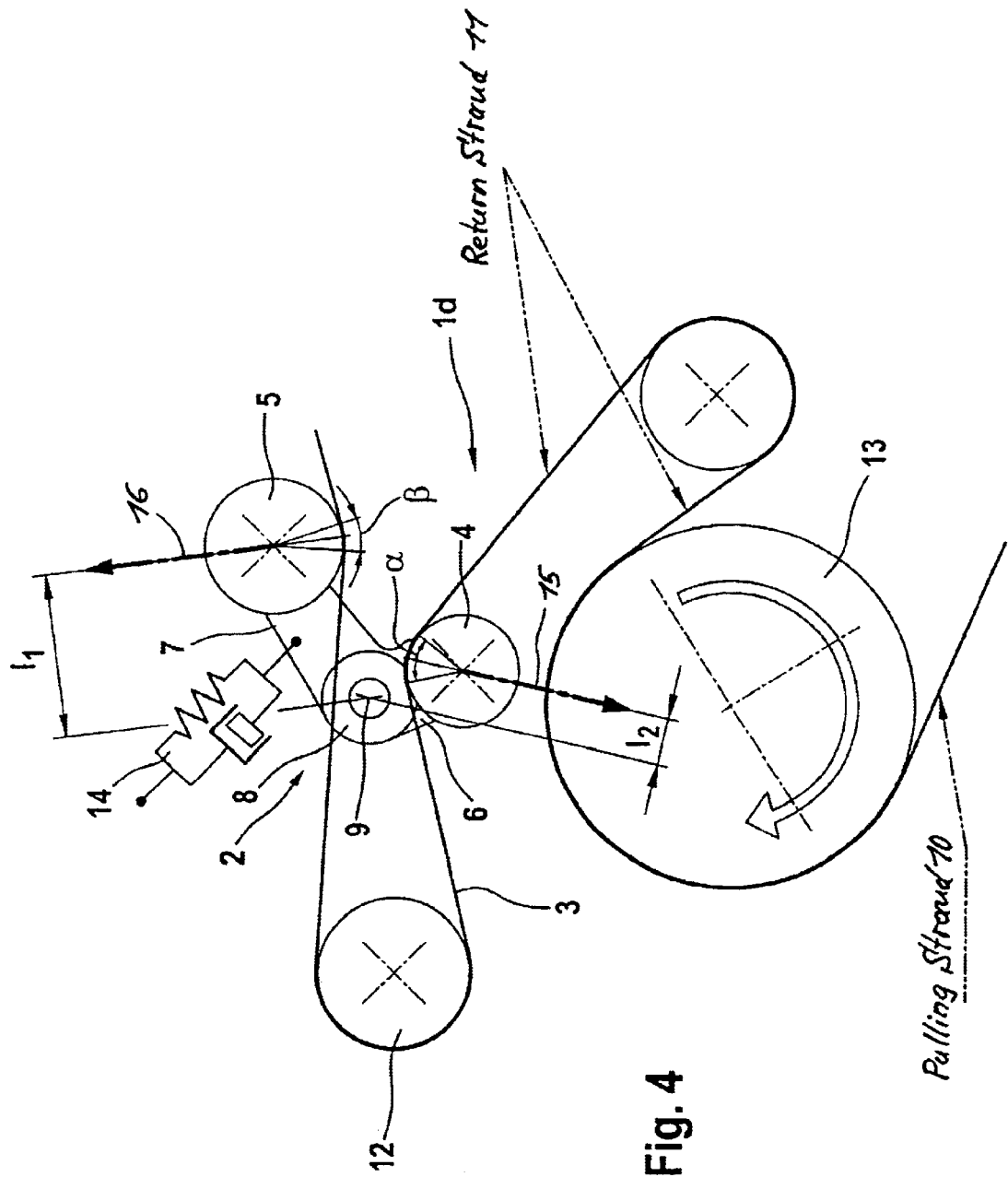
FIG. 4 is a schematic illustration of the traction drive of FIG. 2 with spring member acting the tensioning device.

FIG. 4 shows a schematic illustration of a traction drive in normal operating mode, generally designated by reference numeral 1d, which is similar to the traction drive 1b. Parts corresponding with those in FIG. 1 are denoted by identical reference numerals and not explained again. The traction drive 1d differs from the traction drive 1b only by the provision of a combined spring and damping device 14 which operates in a same way as described in connection with FIG. 3.

As an alternative to the provision of the unitary structure of the spring and damping device 14, the tensioning device 2 may also be comprised of separate components arranged at different locations, e.g., a spring member which is arranged in concentric surrounding relationship to the rotation axis 9 and has one end supported by the hub 8 of the tensioning device 2. Examples of a spring member include mechanical as well as hydraulic spring members.

Referring back to FIG. 3, there is clearly shown the geometric configuration of the tensioning device 2. The lever arms 6, 7 have hereby a length ratio of about 2:1, whereby the lever arms 6, 7 are arranged at an angle of >70° relative to one another. Also the different diameter of the tension pulleys 4, 5 is depicted here, whereby the diameter of the tension pulley 5 on the longer lever arm 7 is significantly greater than the diameter of the tension pulley 4 on the shorter lever arm 4.

While the invention has been illustrated and described in connection with currently preferred embodiments shown and described in detail, it is not intended to be limited to the details shown since various modifications and structural changes may be made without departing in any way from the spirit of the present invention. For example, the tensioning device may have lever arms arranged at an angle relative to one another which deviates from >70°, or the lever arms may be configured at different length ratio, or the tension pulleys may have identical diameters. The embodiments were chosen and described in order to best explain the principles of the invention and practical application to thereby enable a person skilled in the art to best utilize the invention and various embodiments with various modifications as are suited to the particular use contemplated.

What is claimed is:

1. A traction drive for an internal combustion engine, comprising:
   a belt pulley operatively connected to a crankshaft;
   a belt pulley operatively connected to a starter-generator; and
   a tensioning device having two tension pulleys, a traction member for connecting the tension pulleys, two lever arms having different length and constructed for pivoting about a rotation axis, with one tension pulley disposed on one end of one of the lever arms and resiliently bearing against the traction member, and with the other tension pulley disposed on one end of the other one of the lever arms and resiliently bearing against the traction member, wherein the internal combustion engine or the starter-generator selectively introduce a torque into the traction member in dependence on an operating mode of the starter-generator between a starting mode and a normal operating mode, wherein a directional change of the torque is accompanied by a swap between a return strand and a pulling strand of the traction member in the traction drive, wherein the traction member is wrapped about the tension pulleys at different wrap angles, wherein the lever arms extend at an angle of >70° relative to one another, with one lever arm having a length which is at a ratio of 2:1 to a length of the other lever arm, and wherein one tension pulley has a diameter which is greater than a diameter of the other tension pulley.

2. The traction drive of claim 1, wherein one tension pulley bears against the pulling strand of the traction member in a dead center position, when the starter-generator is in the starter mode, whereby a resultant force of the pulling strand substantially coincides in one direction with a connecting line between the rotation axis of the tensioning device and a rotation axis of the one tension pulley.

3. The traction drive of claim 1, wherein the wrap angle of one tension pulley exceeds the wrap angle of the other tension pulley regardless of the operating mode of the starter-generator.

4. The traction drive of claim 1, wherein in the starter mode the rotation axis of the tensioning device is spaced from a directional arrow, which is oriented through a pivot point of one tension pulley and defines a resultant force of the return strand, at a first distance measure which exceeds a second distance measure defined between the rotation axis of the tensioning device and a directional arrow, which is oriented through a pivot point of the other tension pulley and defines a resultant force of the pulling strand.

5. The traction drive of claim 4, wherein in the starter mode the first distance measure is at a maximum, when the one tension pulley bears upon the return strand.

6. The traction drive of claim 1, wherein one tension pulley bears upon the pulling strand and the other tension pulley bears upon the return strand, wherein the rotation axis of the tensioning device is spaced from the other tension pulley by a first distance measure, and the rotation axis of the tensioning device is spaced from the one tension pulley by a second distance measure, wherein in normal operating mode the first distance measure decreases in relation to the starter mode while the second distance measure increases at the same time.

7. The traction drive of claim 1, wherein, as viewed from one tension pulley, the traction member is wrapped around the belt pulley of the starter-generator before looped around the other tension pulley.

8. The traction drive of claim 1, and further comprising a damping device for interaction with the tensioning device.

9. The traction drive of claim 1, and further comprising a combined spring and damping device for interaction with the tensioning device.

10. The traction drive of claim 1, and further comprising a spring member for biasing the tensioning device.

11. The traction drive of claim 10, wherein the spring member is an element selected from the group consisting of hydraulic spring member, mechanical spring member, and a combination thereof.

12. The traction drive of claim 10, wherein the spring member is in direct interaction with one of the lever arms.

13. The traction of claim 10, wherein the tensioning device has a hub, said spring member disposed in an area of the rotation axis of the tensioning device for directly acting upon the hub.

14. A tensioning device for maintaining a pulling strand and a return strand of a traction member of a traction drive in taut condition, comprising:
   a pair of lever arms having different length and pivoting about a common rotation axis, said lever arms extending at an angle of >70° relative to one another, with one lever arm having a length which is twice as long as the other lever arm;
   a first tension pulley disposed on an axis-distal end of one of the lever arms;
   a second tension pulley disposed on an axis-distal end of the other one of the lever arms; and
   a traction member guided around the first and second tension pulleys at different wrap angles,
   wherein one of the first and second tension pulleys has a diameter which is greater than a diameter of the other one of the first and second tension pulleys.

* * * * *